United States Patent
Schilling et al.

(10) Patent No.: US 10,311,720 B2
(45) Date of Patent: Jun. 4, 2019

(54) METHODS AND SYSTEMS FOR GENERATING FLOW DATA

(71) Applicant: TomTom Traffic B.V., Amsterdam (NL)

(72) Inventors: David Schilling, Berlin (DE); Stefan Lorkowski, Berlin (DE); Nikolaus Witte, Berlin (DE)

(73) Assignee: TOMTOM TRAFFIC B.V., Amsterdam (NL)

( * ) Notice: Subject to any disclaimer, the term of this patent is extended or adjusted under 35 U.S.C. 154(b) by 151 days.

(21) Appl. No.: 15/508,920

(22) PCT Filed: Sep. 4, 2015

(86) PCT No.: PCT/EP2015/070221
§ 371 (c)(1),
(2) Date: Mar. 4, 2017

(87) PCT Pub. No.: WO2016/034702
PCT Pub. Date: Mar. 10, 2016

(65) Prior Publication Data
US 2017/0256162 A1    Sep. 7, 2017

(30) Foreign Application Priority Data
Sep. 5, 2014 (GB) .................................. 1415731.7

(51) Int. Cl.
*G08G 1/01* (2006.01)
*G08G 1/052* (2006.01)
*G09B 29/00* (2006.01)

(52) U.S. Cl.
CPC ......... *G08G 1/0133* (2013.01); *G08G 1/0112* (2013.01); *G08G 1/0129* (2013.01);
(Continued)

(58) Field of Classification Search
CPC .... G08G 1/0133; G08G 1/052; G08G 1/0141; G08G 1/0129; G08G 1/0112; G09B 29/003; G09B 29/007
See application file for complete search history.

(56) References Cited

U.S. PATENT DOCUMENTS

2004/0028211 A1*    2/2004    Culp .................. H04M 3/36
                                                    379/265.01

FOREIGN PATENT DOCUMENTS

EP    2040236 A1    3/2009
EP    2341493 A1    7/2011
(Continued)

OTHER PUBLICATIONS

International Search Report dated Dec. 1, 2015 for application No. PCT/EP2015/070221.
(Continued)

*Primary Examiner* — Frederick M Brushaber (57) ABSTRACT

A method of generating flow data indicative of speeds of travel within a navigable network in an area covered by an electronic map is disclosed. The electronic map comprises a plurality of segments representing navigable elements of the navigable network. Live vehicle probe data is obtained indicative of the average speed of travel for the current time with respect to distance along a link, the link being predetermined by reference to the electronic map. The link is sectioned to provide a plurality of sections along the length thereof. The sectioning is carried out based on the data indicative of the current average speed of time along the link. Where a differential in the current average speed exceeds a threshold, a new section is created. Data is generated indicative of the location of the link together with data indicative of each determined section of the link, the data indicative of each determined section of the link being associated with data indicative of the average speed of travel (Continued)

for the current time for the section. The same process can be repeated using predicted flow data for a future time, but using a more stringent threshold, such that the link is divided into a smaller number of longer sections.

18 Claims, 5 Drawing Sheets

(52) U.S. Cl.
CPC ........... *G08G 1/0141* (2013.01); *G08G 1/052* (2013.01); *G09B 29/003* (2013.01); *G09B 29/007* (2013.01)

(56) References Cited

FOREIGN PATENT DOCUMENTS

| WO | 2014001561 A2 | 1/2014 |
|----|---------------|--------|
| WO | 2014103080 A1 | 7/2014 |

OTHER PUBLICATIONS

Search Report dated Feb. 15, 2015 for GB Application No. 1415731.7.

* cited by examiner

| | 80-100 km/h |
| | 60-80 km/h |
| | 40-60 km/h |
| | 20-40 km/h |
| | 0-20 km/h |

Figure 4

| Link ID | Location | Time 1 | Section 1 Location | Section 1 Speed |
|---|---|---|---|---|
| | | | Section 2 Location | Section 2 Speed |
| | | | ⋮ | ⋮ |
| | | | Section N Location | Section N Speed |
| | | Time 2 | Section 1 Location | Section 1 Speed |
| | | | Section 2 Location | Section 2 Speed |
| | | | ⋮ | ⋮ |
| | | | Section N Location | Section N Speed |
| | | ⋮ | ⋮ | ⋮ |
| | | Time N | Section 1 Location | Section 1 Speed |
| | | | Section 2 Location | Section 2 Speed |
| | | | ⋮ | ⋮ |
| | | | Section N Location | Section N Speed |

Figure 5

METHODS AND SYSTEMS FOR GENERATING FLOW DATA

CROSS-REFERENCE TO RELATED APPLICATIONS

The present application is a National Stage of International Application No. PCT/EP2015/070221, filed on Sep. 4, 2015, and designating the United States, which claims benefit to United Kingdom Patent Application 1415731.7 filed on Sep. 5, 2014. The entire content of these applications is incorporated herein by reference.

FIELD OF THE INVENTION

The present invention relates to methods and systems for generating data indicative of flow within a navigable network. The navigable network is in an area covered by an electronic map, the electronic map comprising a plurality of segments representing navigable elements of the navigable network. In accordance with the invention, flow data is determined in respect of one or more links of the navigable network, each link being predefined by reference to the electronic map, and comprising at least a portion of one or more navigable segments of the electronic map. The flow data relates to speeds of travel, i.e. of vehicles, along the segments of the navigable network.

BACKGROUND TO THE INVENTION

Obtaining information about vehicle flow within a navigable network, e.g. a road network, is important in a navigation system. Flow data is indicative of the speeds of travel of vehicles within the network. Flow data may be used in a variety of ways. For example, flow data may be used to determine traffic data for the network. A comparison of actual vehicle speeds to the expected speed of travel or free flow speed of travel at an applicable time may enable regions of reduced flow, e.g. traffic jams, to be identified. Flow data may also be used in routing. Flow data may be used to determine traversal times for elements of the navigable network, enabling routes, e.g. fastest routes, to be generated based on current traversal times. Flow data for a navigable network may provide a real-time picture of vehicle speeds within the entire network. The flow data may be in terms of absolute speeds, i.e. average speeds, of travel, or relative speeds of travel, e.g. relative to an applicable free flow speed. This is in contrast to traffic data, which typically relates to individual events within the network which affect traffic flow. For example, traffic data may be indicative of traffic jams having a start point, an end point, and a particular speed reduction associated therewith. In addition to current flow speed data, predicted flow speed data for one or more future times may alternatively or additionally be generated and used in a similar manner.

While flow speed data may be of great utility, providing such data in a form appropriate for transmission to devices, e.g. to servers or navigation devices, requiring a flow speed data feed presents some challenges. Flow speed data is typically provided in respect of links. As described below, a link is predefined by reference to an electronic map comprising a plurality of navigable segments representing navigable elements of the navigable network. A link may be defined by at least a portion of one or more navigable segments of the map extending between certain fixed reference points of the navigable network. However, flow speeds, i.e. average vehicle speeds, within the network may exhibit relatively small scale variations. For example, average vehicle speeds may vary along the length of navigable links of the network. In order to try to capture such variation, one possibility would be to divide each navigable link of the network into sections of unit length, and to determine flow speed data in respect of each section. The unit length may be set to be sufficiently small to try to capture variation in flow speed along the length of a link. However, such methods may be highly data intensive, requiring large amounts of flow speed data to be generated. This places significant demands on the processing and storage capabilities of devices receiving the data, and requires a large amount of bandwidth for transmission. The Applicant has realised that there remains a need for improved methods and systems for providing flow data in respect of a navigable network.

SUMMARY OF THE INVENTION

In accordance with a first aspect of the invention there is provided a method of generating flow data indicative of speeds of travel within a navigable network in an area covered by an electronic map, the electronic map comprising a plurality of segments representing navigable elements of the navigable network, the method comprising:

obtaining data indicative of the average speed of travel for the current time with respect to distance along a link of the navigable network, wherein the link is predefined by reference to the electronic map and comprises at least a portion of one or more navigable segments of the electronic map;

sectioning the link to provide a plurality of sections along the length thereof, and generating data indicative of the average speed of travel for the current time in respect of each one of the plurality of sections of the link, wherein the link is sectioned based on the data indicative of an average speed of travel for the current time along the link, and optionally one or more further parameters; and storing data indicative of the location of the link for transmittal together with data indicative of each determined section of the link, the data indicative of each determined section of the link being associated with data indicative of the average speed of travel for the current time for the section.

Thus, in accordance with the invention, the or each link is dynamically sectioned based at least on average speed of travel for the current time ("current average speed of travel") with respect to distance along the link, in order to provide a plurality of sections for association with their applicable speed data. The sections into which a link is divided are therefore not of a fixed length, but rather are of a variable length, dependent upon the current average speed of travel along the link, and optionally one or more further parameters (as discussed in more detail below). It has been found that by dynamically sectioning links in this manner, based upon current average speed of travel along the link, sections may be generated in a manner which provides a balance between an appropriate granularity of the data, i.e. to accurately reflect variation in current average speed along the length of the link, but without needing to provide excessive amounts of data that might be unduly demanding upon the data processing and/or storage capabilities of a device generating the data and/or receiving and using the data, or demanding excessive amounts of bandwidth for transmission. For example, in contrast to techniques using fixed length sections, where the choice of the length of sections must be a compromise between trying to adequately capture variation in speed along the length of the link and data processing and/or storage or bandwidth requirements, the present invention enables sections to be provided only when they are required, i.e. when the current average speed along the link changes by a significant amount. This enables data to be transmitted in a more bandwidth efficient manner.

The present invention extends to a system for carrying out a method in accordance with any of the embodiments of the invention described herein.

In accordance with a second aspect of the invention there is provided a system for generating flow data indicative of speeds of travel within a navigable network in an area covered by an electronic map, the electronic map comprising a plurality of segments representing navigable elements of the navigable network, the system comprising:

means for obtaining data indicative of the average speed of travel for the current time with respect to distance along a link of the navigable network, wherein the link is predefined by reference to the electronic map and comprises at least a portion of one or more navigable segments of the electronic map;

means for sectioning the link to provide a plurality of sections along the length thereof, and generating data indicative of the average speed of travel for the current time in respect of each one of the plurality of sections of the link, wherein the link is sectioned based on the data indicative of an average speed of travel for the current time along the link, and optionally one or more further parameters;

and means for storing data indicative of the location of the link for transmittal together with data indicative of each determined section of the link, the data indicative of each determined section of the link being associated with data indicative of the average speed of travel for the current time for the section.

It will be appreciated that any feature described by reference to the first aspect of the invention may equally be applied to embodiments in accordance with the second aspect of the invention and vice versa.

The present invention in these further aspects may include any or all of the features described in relation to the first and second aspects of the invention, and vice versa, to the extent that they are not mutually inconsistent. Thus, if not explicitly stated herein, the system of the present invention may comprise means for carrying out any of the steps of the method described.

The means for carrying out any of the steps of the method may comprise a set of one or more processors configured, e.g. programmed, for doing so. A given step may be carried out using the same or a different set of processors to any other step. Any given step may be carried out using a combination of sets of processors. The system may further comprise data storage means, such as computer memory, for storing, for example, the generated data indicative of sections of a link, and the associated speed data.

The methods of the present invention are, in preferred embodiments, implemented by a server. Thus, in embodiments, the system of the present invention comprises a server comprising the means for carrying out the various steps described, and the method steps described herein are carried out by a server.

The present invention may be implemented in respect of one or more links of the navigable network, and is preferably implemented in respect of a plurality of links. Any of the steps described by reference to a link, may be carried out in respect of one or more further link. The or each link may be any link in respect of which it is desired to generate flow data.

It will be appreciated that the navigable network as referred to herein is a real world or physical navigable network, e.g. a road network. The invention is applicable, however, to any navigable network, e.g. networks of paths, rivers, canals, cycle paths, tow paths, railway lines, or the like. Thus, while the flow data may be referred to as vehicle flow data, and the speed data (whether current or predicted average speed data or free flow data) as vehicle speed data, it will be appreciated that this may not necessarily be the case, and the invention is applicable to any form of flow data, i.e. relating to speeds of travel along navigable links of a navigable network of any type.

The network is represented by electronic map data. The electronic map data may be stored by or otherwise accessible by the server, in embodiments in which the method is implemented using a server. In the electronic map data, the navigable network is represented by a plurality of navigable segments connected by nodes, wherein a navigable element of the network, e.g. a road where the navigable network is a road network, may be represented by one or more navigable segments. The term "navigable link" as used herein refers to at least a portion of one or more navigable segments of the electronic map. The link is predefined by reference to the electronic map. The navigable link may be made up of a part of any contiguous segment or segments and/or may include one or more entire contiguous segments. Typically a link comprises at least a portion of two or more contiguous navigable segments.

A link is defined between first and second reference locations with respect to the electronic map. The reference locations may correspond to the ends of segments of the electronic map, or may be located between the ends of segments of the electronic map, or a combination thereof. The reference locations at the ends of a link will typically correspond to reference locations in the real world network. Thus, a navigable link defined by reference to the electronic map is representative of a link in the real world, extending between reference locations in the real world network, which reference locations may be located at the ends of navigable elements of the network, or between the ends thereof. The reference locations in the real world, and which are represented by the electronic map, may correspond to locations which are common to different electronic maps, i.e. to fixed features of the real-world navigable network. For example, the locations may be junctions. In some embodiments, the location of the link may be defined between, or with reference to, pre-coded Traffic Message Channel (TMC) locations. In other embodiments, the location of the link can be defined using a map agnostic, dynamic location referencing system, such as OpenLR™, AGORA-C or TPEG-ULR.

The method comprises the step of obtaining data indicative of a current average speed of travel with respect to distance along the link. The data may be obtained in any suitable manner. Preferably the data is based at least in part on positional data relating to the movement of a plurality of devices with respect to time along navigable segments of the navigable network as represented by the electronic map data. The positional data used in accordance with the invention is positional data relating to the movement of a plurality of devices along the or each navigable segment with respect to time. The method may comprise obtaining positional data relating to the movement of a plurality of devices with respect to time in the navigable network, and filtering the positional data to obtain positional data relating to the movement of a plurality of devices along the or each given navigable link with respect to time. The step of obtaining the positional data relating to the movement of devices along the or each navigable link may be carried out by reference to the electronic map data indicative of the navigable network. The method may involve the step of matching positional data relating to the movement of devices in a geographic region including the navigable network to at least the or each navigable segment or portion thereof that define a link being considered in accordance with the invention.

In some arrangements the step of obtaining the positional data may comprise accessing the data, i.e. the data being previously received and stored. In other arrangements the method may comprise receiving the positional data from the devices. In embodiments in which the step of obtaining the data involves receiving the data from the devices, it is envisaged that the method may further comprise storing the received positional data before proceeding to carry out the other steps of the present invention, and optionally filtering the data. The step of receiving the positional data need not take place at the same time or place as the other step or steps of the method.

The positional data used in accordance with the invention is collected from one or more, and preferably multiple devices, and relates to the movement of the devices with respect to time. Thus, the devices are mobile devices. It will be appreciated that at least some of the positional data is associated with temporal data, e.g. a timestamp. For the purposes of the present invention, however, it is not necessary that all positional data is associated with temporal data, provided that it may be used to provide the information relating to the movement of devices along a navigable segment in accordance with the present invention. However, in preferred embodiments all positional data is associated with temporal data, e.g. a timestamp.

The positional data relates to the movement of the devices with respect to time, and may be used to provide a positional "trace" of the path taken by the device. As mentioned above, the data may be received from the device(s) or may first be stored. The devices may be any mobile devices that are capable of providing the positional data and sufficient associated timing data for the purposes of the present invention. The device may be any device having position determining capability. For example, the device may comprise means for accessing and receiving information from WiFi access points or cellular communication networks, such as a GSM device, and using this information to determine its location. In preferred embodiments, however, the device comprises a global navigation satellite systems (GNSS) receiver, such as a GPS receiver, for receiving satellite signals indication the position of the receiver at a particular point in time, and which preferably receives updated position information at regular intervals. Such devices may include navigation devices, mobile telecommunications devices with positioning capability, position sensors, etc.

Preferably the device is associated with a vehicle. In these embodiments the position of the device will correspond to the position of the vehicle. References to positional data obtained from devices associated with vehicles, may be replaced by a reference to positional data obtained from a vehicle, and references to the movement of a device or devices may be replaced by a reference to the movement of a vehicle, and vice versa, if not explicitly mentioned. The device may be integrated with the vehicle, or may be a separate device associated with the vehicle such as a portable navigation apparatus. Of course, the positional data may be obtained from a combination of different devices, or a single type of device.

The positional data obtained from the plurality of devices is commonly known as "probe data". Data obtained from devices associated with vehicles may be referred to as vehicle probe data. References to "probe data" herein should therefore be understood as being interchangeable with the term "positional data", and the positional data may be referred to as probe data for brevity herein.

The present invention uses "live", i.e. short term, flow data, based on current or near current data. Preferably the positional data that is used in accordance with the invention therefore comprises "live" positional data. For live positional data, it will be appreciated that the data may be stored shortly before being used, so that it may still be considered to be live data. The method of the present invention involves obtaining and using live positional data relating to the movement of a plurality of devices with respect to time along the or each navigable link. Live data may be thought of as data which is relatively current and provides an indication of relatively current conditions on each navigable link. The live data may typically relate to the conditions on the navigable segments or links of the network within the last 30 minutes, 15 minutes, 10 minutes or 5 minutes. The positional data is used to determine a current (i.e. live or near live) average speed of travel along the navigable link in a given time period (which preferably includes the current time). In embodiments, in which the obtained positional data relates to the movement of a plurality of devices along one or more navigable segments of the digital map, the positional data is used to determine an average speed of travel along the link in the given time period.

Of course, the current average speed data used in accordance with the invention may alternatively or additionally be based upon one or more additional sources of speed data, e.g. data obtained from fixed or mobile sensors, etc. It should also be appreciated that where a sufficient quantity of "live" positional data is not available, the live positional data may be supplemented by historical positional data, whether probe data or otherwise. Thus, the positional data that is used in accordance with preferred embodiments of the invention to provide the current speed data comprises live data, but may not consist of such data.

The data indicative of the current average speed of travel along a link may be in terms of an absolute current average speed of travel along the link, or a relative current average speed of travel along the link. For example, in some embodiments, the data may be indicative of the current average speed of travel along the link relative to a free flow speed for the link. It will be appreciated that any reference to data indicative of an average speed of travel along a link, or section thereof herein, whether for the current time or a future time, or to such an average speed of travel, may refer to an absolute or relative average speed of travel. A relative speed of travel will typically be relative to an applicable free flow speed of travel for a link, or applicable section thereof. The applicable free flow speed is a free flow speed applicable to the current time. Preferably the average speed of travel used in sectioning, whether for a current or future time, and which is associated with the section data, is an absolute speed. The method may comprise carrying out the steps of the invention in relation to both absolute and relative speed data, i.e. absolute average speed data and relative speed data (relative to a free flow speed) to enable both types of speed data to be generated for subsequent transmittal.

In accordance with the invention in any of its embodiments, the or each link is sectioned to provide a plurality of sections along the length thereof, and, in respect of each section, average speed data for the current time is generated. The term "sectioning" a link refers to splitting a link, i.e. initiating a new section. The link is sectioned based on at least the current average speed of travel along the link, i.e.

with respect to distance along the link. The method may comprise sectioning the link using at least one threshold based on the current average speed of travel along the link. Preferably the link is sectioned using a threshold in respect of a current average speed of travel differential along the length of the link. The differential may be in terms of an absolute or relative current average speed of travel, e.g. relative to an applicable free flow speed for the link. The differential is a longitudinal differential, i.e. with respect to distance along the length of the link. The current average speed differential refers to a difference in average speed associated with adjacent portions along the length of the link. The method may comprise sectioning the link when it is determined that a differential in the current average speed of travel between adjacent portions of the link exceeds the threshold. The method may comprise, when it is determined that a differential in the current average speed of travel between one or more set of adjacent portions of the link exceeds the threshold, for the or each set of adjacent portions, dividing the link into sections comprising the adjacent portions of the link.

In these embodiments using a threshold, the threshold is a predetermined threshold. The threshold may be set at any suitable level to result in the creation of sections where there is a differential in current average speed that is deemed significant. For example the threshold may be set at a differential (in terms of absolute or relative average speed) of 20 km/h.

One or more additional parameters may be taken into account when sectioning the link in respect of current speed data. These parameters used in sectioning in respect of current speed data may be referred to as a "first set of parameters" to contrast them with parameters used for sectioning in respect of future time data, where obtained. The one or more further parameters may include a free flow speed for the link, the existence of a traffic event affecting the link, and a requirement in relation to a minimum length of each section. The method may comprise sectioning the link when one or more criteria in respect of one or more of these parameters is met. The free flow speed for the link is a free flow speed applicable to the current time. For example, this would not take into account changes in free flow speed expected in the future due to planned roadworks.

The method may comprise sectioning the link using at least one threshold based on the free flow speed of travel along the link. The free flow speed is the free flow speed applicable to the current time. The link may be sectioned using a threshold in respect of a free flow speed of travel differential along the length of the link. The differential is a longitudinal differential, i.e. with respect to distance along the length of the link. The free flow speed differential refers to a difference in free flow speed associated with adjacent portions along the length of the link. The method may comprise, when it is determined that a differential in the free flow speed of travel between adjacent portions of the link exceeds the threshold, sectioning the link. The method may comprise, when it is determined that a differential in the free flow speed of travel between one or more set of adjacent portions of the link exceeds the threshold, for the or each set of adjacent portions, dividing the link into sections comprising the adjacent portions of the link. This process may be carried out in any of the manners described in respect of the average speed. The threshold is a predetermined threshold. The threshold may be set at any suitable level to result in the creation of sections where there is a differential in free flow speed that is deemed significant. The threshold may be the same or different to the threshold used in respect of current average speed. For example the threshold may be set at a differential in free flow speed of 20 km/h. In these embodiments the link may be divided into sections when either the threshold in respect of the current average speed differential or the free flow speed differential is exceeded.

The free flow time speed of a navigable link is indicative of the average speed of vehicles traversing the link during a period of time in which there is no or substantially little traffic. This period may for example be one or more night-time hours where the attainable speed may be less influenced by other users. Such free flow speeds will still reflect the influence of speed limits, road layout and traffic management infrastructure for example. In embodiments data indicative of the free flow speed is associated, in the electronic map data, with data indicative of the navigable segment to which it relates. A free flow speed with respect to distance along a link may be determined using the free flow data associated with navigable segments of the electronic map forming part of the link. A differential in free flow speed may occur, e.g. when there is a change in speed limit associated with different portions of the link, or a difference in road layout, e.g. number of lanes, etc. This might be as a result of longer term roadworks. In general, sections based on free flow speed differential are less likely to change over time than sections based on current average speed differential. This is because free flow speed along a link will not be influenced by transient areas of congestion. However, a more permanent change to the road layout, or a change in speed limit associated with a part of the link, may result in a change in free flow speed differential between portions of the link.

The method may extend to the step of obtaining the free flow speed for the or each navigable link or segment. The step of obtaining the free flow speed for a link or segment may comprise analysing positional data relating to the movement of devices that traversed the navigable link or segment within a given predetermined time period. The relevant data may be obtained by suitable filtering of the positional data by reference to time. In order to be able to obtain a free flow speed, the predetermined time period should be chosen appropriately so that it will include data relating to movements which are representative of movements made under free flow conditions. Typically the time period will be relatively long, such as a 24 hour period, or longer. For example, a week long period, or even a month or longer period might be considered, if free flow conditions do not occur every day, or week, etc. The step of obtaining the free flow speed for a link or segment may comprise analysing positional data relating to the movement of devices that traversed the link or segment within a given predetermined time period, preferably wherein the free flow time obtained by averaging the speed of different devices traversing the link or segment in the given time period.

The method may alternatively or additionally comprise sectioning the link when a traffic event associated with the link is detected, e.g. where there is a closure or traffic jam affecting the link. The link may be sectioned at an end or ends of an affected portion as applicable. It will be appreciated that only one end of a portion of a navigable stretch affected by a traffic event may be located along the link, and thus sectioning may occur only in relation to the end of a traffic event that is present on the link.

Regardless of the other parameters used in sectioning the link, the sectioning of the link may be constrained by a requirement in relation to a minimum length of each section. Thus, where sectioning is indicated by any parameter considered, e.g. by the current average speed, or indeed the free flow section, the method may comprise the step of sectioning the link only if a section or sections created exceed the minimum length requirement.

In accordance with the invention the method may comprise analysing the data indicative of the current average speed of travel with respect to distance along the link, and sectioning the link when a current average speed differential along the length of the link is detected that exceeds a threshold. Optionally the method may comprise analysing data indicative of a free flow speed of travel with respect to distance along the link, and sectioning the link when a free flow speed differential along the length of the link exceeds a threshold; and/or analysing data indicative of traffic events affecting links of the network, and sectioning the link when a traffic event associated with the link is detected, e.g. at an end or ends thereof. Thus, the link may be sectioned when the condition in respect of any one of current speed, free flow speed and traffic events is met. In any of these cases, the method may optionally comprise sectioning the link only when the sectioning would result in a section having a length exceeding a predetermined minimum length. The detection of a differential (whether in respect of current average speed or free flow speed) exceeding the threshold, or in some embodiments, the existence of a traffic event affecting the link, triggers the sectioning of the link. The sectioning occurs at or around a point along the length of the link associated with the speed differential or end of the traffic event as appropriate. The next sectioning of the link may be triggered when a differential is next detected to exceed the threshold (or another threshold used in sectioning of the link), or, in embodiments, an end of a traffic event is detected, subject to any constraints placed on the sectioning process.

In addition to obtaining data indicative of a current speed of travel along a link, the method may comprise obtaining data indicative of a predicted average speed of travel with respect to distance along the link for one or more future times. For example, the future times may include times at 15, 30 and 45 minutes from the current time. Predicted flow data for a future time may be obtained in any suitable manner. The predicted flow data may be based on flow data for the current time, i.e. the current speed data for the link. The flow data may be based on the current flow data and at least data indicative of an expected speed of travel for the applicable future time. Data indicative of at least one expected speed of travel may be associated with each segment of the electronic map. The or each expected speed of travel may be any suitable expected speed of travel indicative of the expected average speed of travel along the segment. The expected speed of travel may be time dependent. Thus the or each expected speed of travel may be in respect of an applicable given time period. The prediction may then be based on the expected speed for the applicable time period for the segment(s) forming part of the link. The prediction may additionally be based upon data indicative of traffic events affecting links of the navigable network. The data indicative of a traffic event is associated with data indicative of a flow speed for the affected link or portion thereof. Where a traffic event is associated with the link, or a portion thereof, and is applicable at a future time, the predicted flow speed at the future time for the link, or affected portion thereof, may be maintained at the flow speed associated with the traffic event.

In any of the embodiments of the invention that take into account an expected speed of travel along a link or segment, the or an expected speed of travel along a navigable link or segment may be a historical speed of travel along the navigable link or element. In this context the words "historic" or "historical" should be considered to indicate data that is not live, that is data that is not directly reflective of conditions on the link or segment at the present time or in the recent past (perhaps within roughly the last five, ten, fifteen or thirty minutes). Historic average speeds and historic travel times may for example relate to events occurring days, weeks or even years in the past. A historic average speed may be recorded directly, or may be calculated from a recorded historic travel time across the link or segment. Historical positional data can also be referred to as aggregated positional data, since it will typically comprise positional data from a plurality of different mobile devices collected over an extended period of time, such as a number of weeks or months. The historical speed of travel along a navigable link or segment may be an average historical speed of travel. An element may have a plurality of historic average speeds of travel associated therewith, e.g. with each average speed being representative of the average speed along the segment during a particular time period. The time periods may be in respect of different times of day and days of the week.

The link may be sectioned by reference to predicted average speed data for a future time or times in a similar manner to that described by reference to the current speed data (and optionally one or more further parameters). The steps below are described in relation to predicted speed data for a future time. However, the steps may be performed in respect of data for each of one or more future times, and preferably for each of a plurality of future times. The data indicative of an average speed for a future time, may, as discussed in relation to the current time data, be based on data indicative of an absolute speed or a relative speed e.g. relative to an applicable free flow speed. Preferably the speed is an absolute speed. However the method may be performed in respect to both absolute and relative speeds.

The method may comprise sectioning the link to provide a plurality of sections along the length thereof, and generating data indicative of a predicted average speed of travel for one or more future time in respect of each one of the plurality of sections of the link, wherein, for each future time, the link is sectioned based on the predicted average speed of travel for the future time, and optionally one or more further parameters; and storing data indicative of the location of the or each link together with data indicative of each determined section of the link, the data indicative of each determined section of the link being associated with data indicative of the predicted speed of travel for the future time for the section.

Preferably, for the or each future time, the method comprises sectioning the link using at least one threshold based on the predicted average speed of travel along the link for the future time. The following is applicable to the or each future time for which predicted speed data is obtained. Preferably the link is sectioned using a threshold in respect of a predicted average speed of travel differential along the length of the link for the future time. The differential is a longitudinal differential, i.e. with respect to distance along the length of the link. The predicted average speed differential refers to a difference in predicted average speed associated with adjacent portions along the length of the link. The method may comprise, when it is determined that a differential in the predicted average speed of travel adjacent portions of the link exceeds the threshold, sectioning the link. The method may comprise, when it is determined that a differential in the predicted average speed of travel between one or more set of adjacent portions of the link exceeds the threshold, for the or each set of adjacent portions, dividing the link into sections comprising the adjacent portions of the link.

In these embodiments the threshold is a predetermined threshold. The threshold may be set at any suitable level to result in the creation of sections where there is a differential in current average speed that is deemed significant. Preferably, the threshold used in sectioning the link in respect of the or each future time is a more stringent threshold than the threshold used in sectioning a link based on current average speed of travel along the link. By "more stringent", it means that the threshold is less likely to result in the creation of a new section. Thus, the requirement to be met for creation of a new section to be triggered has been tightened. In preferred embodiments, for the or each future time, the link is sectioned based on the predicted average speed of travel along the link for the future time, and optionally one or more further parameters, wherein the link is sectioned using a threshold based on the predicted average speed of travel along the link for the future time, the threshold being a more stringent threshold than the threshold used in sectioning a link based on current average speed of travel along the link. Where the threshold relates to a differential in the predicted speed along the link, the more stringent threshold will be a higher threshold. For example the threshold may be set at a differential of 40 km/h by comparison to a 20 km/h threshold used for current speed. This has a result that the link will only be sectioned when the predicted speed exhibits a greater differential than would be the case for the current speed data. The method may comprise, for the or each future time, sectioning the link using a threshold based upon a speed differential, wherein when it is determined that the predicted average speed of travel for the future time between first and second portions of the link differs by an amount exceeding the threshold, the link is split, e.g. to provide first and second sections comprising the first and second portions of the link, wherein the threshold used for sectioning the link in respect of the speed data for the or each future time is a more stringent, i.e. higher threshold than the threshold used for sectioning the link in respect of the speed data for the current time.

Where predicted speed data is obtained for more than one successive future time, the thresholds used for each future time may be the same. However, a different threshold may be used for each future time, with the thresholds becoming more stringent for the successive future times. In other words, the more remote the future time, the more stringent the threshold used. In preferred embodiments the threshold is a threshold in respect of a differential in the predicted speed data along the link, and the thresholds increase in respect of successive future times.

It will be appreciated that by tightening the thresholds used in sectioning the link in respect of predicted speed data, by comparison to current speed data, i.e. to make the requirements that must be satisfied before a new section is created more stringent, a smaller number of sections are likely to be obtained for the predicted data, in comparison to the current data. In other words, the granularity of the data will be less than for the current time data. The Applicant has recognised that as predicted data is inherently less reliable than current time data, there is little point in providing a granularity in the data to the same degree as with current data. This may help to reduce the bandwidth needed to transmit the predicted speed data. Tightening of a threshold, or making a threshold more stringent as described herein refers to modifying the threshold to require a greater difference in the parameter to which the threshold relates before a new section is created. In general the method may comprise adjusting at least one threshold used in sectioning of the link in respect of current average speed data in a manner which will reduce the likelihood of a new section being created when using the threshold to section the link in respect of predicted average speed data for a future time or times. For a given set of speed data, the threshold used for sectioning the link in respect of the data if it were current speed data would result in more sections being created than if the data were future time predicted speed data.

As with the current speed data, the sectioning of the link for use with predicted speed data in respect of one or more future times may be based upon other parameters in addition to the predicted speed data. The sectioning of the predicted speed data for the or each future time may additionally be based upon one or more of a set of one or more further parameters. The set of one or more further parameters may be referred to as a "second set of further parameters" to contrast them with the first set of parameters which may be used in sectioning the current time data. The second set of one or more parameters may differ from the first set of one or more parameters. The one or more further parameters of the second set of further parameters may include a free flow speed for the link, the existence of a traffic event affecting the link, and a requirement in relation to a minimum length of each section. The method may comprise sectioning the link when one or more criteria in respect of one or more of these parameters is met. Preferably at least some of the criteria based on the second set of one or more parameters used to section the link differ from corresponding ones of the first set of one or more parameters used for sectioning a link in respect of the current speed data. Sectioning the link in respect of future time speed data by reference to any one of these further parameters may proceed as described above in relation to the current time data. The free flow data will be the free flow data for the applicable time, i.e. for the future time being considered.

Preferably at least some of the set of further parameters is a more stringent parameter than a corresponding one or ones of the set of parameters used in sectioning the link for use with the current average speed data. In accordance with the invention the method may comprise sectioning the link in respect of current average speed data based on the current average speed of travel along the link and optionally a set of one or more further parameters (i.e. a first set of one or more further parameters), and sectioning the link in respect of predicted average speed data for each of one or more future time based on the predicted average speed of travel along the link for the future time and optionally a set of one or more further parameters (i.e. a second set of one or more further parameters), wherein the link is sectioned in relation to the current average speed data when a first set of one or more criteria relating to the current average speed of travel along the link and optionally the first set of one or more further parameters is fulfilled, and the link is sectioned in respect of the predicted average speed of travel data for the or each future time when a second set of one or more criteria relating to the predicted average speed of travel along the link for the future time and optionally the second set of one or more further parameters is fulfilled, wherein at least some of the second set of criteria are more stringent than the corresponding ones of at least some of the first set of criteria. Preferably at least a criterion of the second set of criteria relating to the current average speed is more stringent than a corresponding criterion of the first set of criteria relating to the predicted average speed for a future time. The criterion may be a threshold e.g. relating to a speed differential as previously described. The or each other criterion considered may also be in terms of a threshold.

Where predicted speed data is obtained for more than one successive future time, corresponding criteria used for sectioning the link in respect of each future time may be the same. However, the criteria may become more stringent for the successive future times.

The method may comprise sectioning the link in respect of future time speed data using at least one threshold based on a predicted free flow speed of travel along the link for the future time. The link may be sectioned using a threshold in respect of a free flow speed of travel differential along the length of the link for the future time. The differential is a longitudinal differential, i.e. with respect to distance along the length of the link. The free flow speed differential refers to a difference in free flow speed associated with adjacent portions along the length of the link. The method may comprise, when it is determined that a differential in the free flow speed of travel between adjacent portions of the link for a future time exceeds the threshold, sectioning the link. The method may comprise, when it is determined that a differential in the free flow speed of travel between one or more set of adjacent portions of the link for a future time exceeds the threshold, for the or each set of adjacent portions, dividing the link into sections comprising the adjacent portions of the link. This process may be carried out in any of the manners described in respect of the average speed. The threshold is a predetermined threshold. The threshold may be set at any suitable level to result in the creation of sections where there is a differential in free flow speed for a future time that is deemed significant. The threshold may be the same or different to the corresponding threshold used in respect of sectioning of the link for current free flow data. For example, a more stringent threshold may be used. However, in some preferred embodiments the threshold for the data in respect of free flow speed the or each future time is the same as the threshold used for the data in respect of the current time. This reflects that the variation in free flow speed is typically attributable to changes in the infrastructure of the link, in contrast to current average speed, which may vary due to more transient changes in traffic condition affecting the link etc. Thus triggering of sectioning by free flow data may be relatively uncommon, and unaffected by current conditions on the link. Thus, maintaining the threshold the same for future time data would not be expected to have a significant impact on bandwidth required for transmission of the data, and the inherent reliability of the data is likely to be similar for future time(s) and the current time.

Traffic event data may or may not be used for sectioning a link in respect of future time average speed data. It is envisaged that predicted traffic event data may be used, as traffic events typically are associated with an end time, typically a predicted end time, enabling it to be predicted whether an event will be applicable at a future time.

As with speed data for a current time, the sectioning of the link in respect of predicted speed data for one or more future time may be constrained by a requirement in relation to a minimum length of each section. In some embodiments the minimum length used in respect of sectioning the link in respect of predicted average speed data is a longer length than the minimum length used in sectioning the link in respect of current average speed data. Thus the minimum length requirement for sectioning the link in respect of future time data is a more stringent requirement than for the current time data. The minimum length requirement may be the same in respect of each future time, where more than one future time is considered, or the minimum length may be greater for each successive future time.

In accordance with the invention the method may comprise analysing the data indicative of the average speed of travel with respect to distance along the link for the or each future time, and sectioning the link when the average speed differential along the length of the link for a future time is detected that exceeds a threshold. Optionally the method may comprise analysing data indicative of a predicted free flow speed of travel with respect to distance along the link for a future time, and sectioning the link when a free flow speed differential along the length of the link exceeds a threshold; and/or analysing data indicative of traffic events affecting links of the network for the or each future time, and sectioning the link when a traffic event associated with the link is detected e.g. at an end or ends thereof. Thus, the link may be sectioned when the condition in respect of any one of speed, free flow speed and traffic events at the future time or times is met. In any of these cases, the method may optionally comprise sectioning the link only when the sectioning would result in a section having a length exceeding a predetermined minimum length. The detection of a differential (whether in respect of average speed for a future time or predicted free flow speed) exceeding the threshold, or in some embodiments, the existence of a traffic event affecting the link, triggers the sectioning of the link.

For both the current time data, and where applicable, any future time data, the method comprises storing data indicative of a location of the link, together with data indicative of each determined section of the link. The data indicative of each section of the link is associated with its applicable average speed data for the applicable time. The data indicative of a location of the link may be any suitable data that may enable the location to be determined. The location data may comprise one or more location references indicative of the location of the link. The location data may be indicative of the locations of reference locations defining the ends of the link. In some embodiments the location data may be by reference to the or an electronic map. However, in some preferred embodiments the location data is by reference to a map agnostic location referencing system. The method may comprise converting data indicative of the location of the link by reference to the electronic map, e.g. the reference locations thereof, into a map agnostic form for storage. This may be carried out by encoding the locations in accordance with a map agnostic location referencing system. When the data is subsequently transmitted to a remote device, the device may receive the encoded location information, and decode the information to obtain a location in its own electronic map that corresponds to the location in the server's electronic map that was originally encoded. Examples of such map agnostic systems include OpenLR™, AGORA-C and TPEG-ULR. In some embodiments the location data may comprise one or more TMC identifier indicative of a reference location defining the location of the link. In other embodiments the location data may comprise one or more dynamic location references, such as may be provided by a map agnostic system, e.g. OpenLR™, AGORA-C, etc. The data indicative of each determined section of a link may be of any suitable form, and will depend upon the nature of the data indicative of the location of the link used. The data indicative of a section may be indicative of the location of the section, e.g. a start point thereof, in terms of an offset from a location of the link, e.g. from a reference location associated with the link.

The generated data may be used in any suitable manner. The data is generated for transmittal to one or more remote devices. The method extends to the step of transmitting the generated data, or at least a portion thereof. The data may be transmitted automatically, or in response to a request from a device. The method may comprise a server that generates the data informing a device or another server that the data is available, e.g. at a specific location, such that the device or other server may then subsequently retrieve the data from that location.

The data may be transmitted to, or generated for transmittal to, any type of remote client device. For example, the device might be associated with a vehicle. The or each device may be a navigation device, such as a PND or integrated navigation device, and/or an automatic vehicle management system, e.g. ADAS system associated with a vehicle. Alternatively or additionally, in preferred embodiments in which the data is generated by a server, the device for which the data is generated, or to which it is transmitted, may be another server, e.g. a client server. The data may then be transmitted via a communication network. The another server may then use the obtained data or not, depending upon its settings. The another server may in turn issue the data to one or more client devices associated with vehicles and in communication therewith. In these embodiments the another server may be arranged to receive flow data, e.g. from one or more servers, and may select a subset of the data for transmittal to its client devices. The another server may be a server associated with an automobile manufacturer, or navigation system provider, etc. It will be appreciated that the present invention enables a flow feed to be provided to a device.

In any of the embodiments of the invention in which a server generates the flow data, the server may broadcast the generated data. The data may be output in any suitable manner to enable it to be used by any one of a plurality of servers and/or devices associated with vehicles, e.g. navigation devices and/or automatic vehicle control systems. This is in contrast to transmitting the data to, for example, a specific navigation device associated with a vehicle.

Received flow data may be used in various manners, e.g. to provide a representation of flow speeds in an area of interest, for route planning or to identify one or more traffic events.

It will be appreciated that the methods in accordance with the present invention may be implemented at least partially using software. It will this be seen that, when viewed from further aspects, the present invention extends to a computer program product comprising computer readable instructions adapted to carry out any or all of the method described herein when executed on suitable data processing means. The invention also extends to a computer software carrier comprising such software. Such a software carrier could be a physical (or non-transitory) storage medium or could be a signal such as an electronic signal over wires, an optical signal or a radio signal such as to a satellite or the like.

The present invention in accordance with any of its further aspects or embodiments may include any of the features described in reference to other aspects or embodiments of the invention to the extent it is not mutually inconsistent therewith.

Any reference to comparing one item to another may involve comparing either item with the other item, and in any manner.

It should be noted that the phrase "associated therewith" in relation to one or more segments or stretches should not be interpreted to require any particular restriction on data storage locations. The phrase only requires that the features are identifiably related to a segment or link. Therefore association may for example be achieved by means of a reference to a side file, potentially located in a remote server.

Advantages of these embodiments are set out hereafter, and further details and features of each of these embodiments are defined in the accompanying dependent claims and elsewhere in the following detailed description.

BRIEF DESCRIPTION OF THE DRAWINGS

Various aspects of the teachings of the present invention, and arrangements embodying those teachings, will hereafter be described by way of illustrative example with reference to the accompanying drawings, in which.

DETAILED DESCRIPTION OF THE PREFERRED EMBODIMENTS

The present invention is, in preferred embodiments at least, directed to methods and systems for generating vehicle flow data in respect of links of a road network. The road network is represented by electronic map data. The electronic map data comprises data indicative of a plurality of road segments connected by nodes, which are representative of road elements of the real world road network.

A link refers to a stretch comprising at least a portion of one or more road segments of the road network as represented by the electronic map. A link is predefined with respect to the electronic map, and extends between locations corresponding to fixed reference points of the real world road network. The location of a link may be encoded using a reference location such as a TMC identifier or dynamic location reference, such as an OpenLR™ reference, AGORA-C reference, etc. TMC identifiers are typically confined to higher class roads, such as highways, while other referencing systems such as OpenLR™ or AGORA-C may be used to define a link in respect of any type of road segment(s). Location referencing according to any of these systems may provide a map agnostic location reference, which may be used to identify the relevant location in respect of an electronic map that is different to that by reference to which the location was initially specified.

The steps of the method may be carried out in respect of the or each link of the network for which it is desired to determine flow data. For ease of reference, the steps of the method will be described by reference to a single link. The method will be described by reference to FIG. 1.

Figure 1:
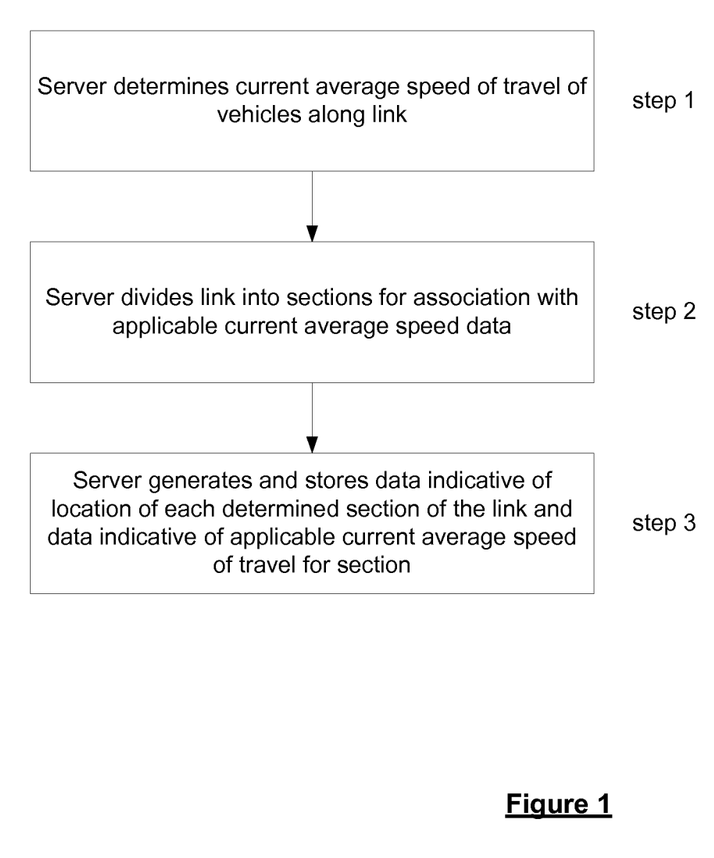
FIG. 1 is a flow chart illustrating the steps of a method for generating flow speed data in accordance with an embodiment of the invention.

The method exemplified by FIG. 1 is realised in a live system using live positional data, e.g. GPS probe data available for analysis within a short period of time, e.g. 3 minutes. The probe data is vehicle probe data received from devices associated with the vehicles, e.g. GPS devices, whose position corresponds to that of the vehicle. The probe data may alternatively be referred to as "positional data". The probe or positional data is associated with temporal data. The positional data may be matched to road segments of an electronic map representing the network of road elements. The method is realised in a live system using live positional data, e.g. GPS probe data available for analysis within a short period of time, e.g. 3 minutes. It will be appreciated that where a sufficient volume of live probe data is not available for a road segment, the data may be supplemented by other forms of data indicative of the speeds of vehicles traversing the segment, such as historical probe data. Such data may be used to "fill the gaps" in the live data, as is known in the art.

Figures 3A, 3B:
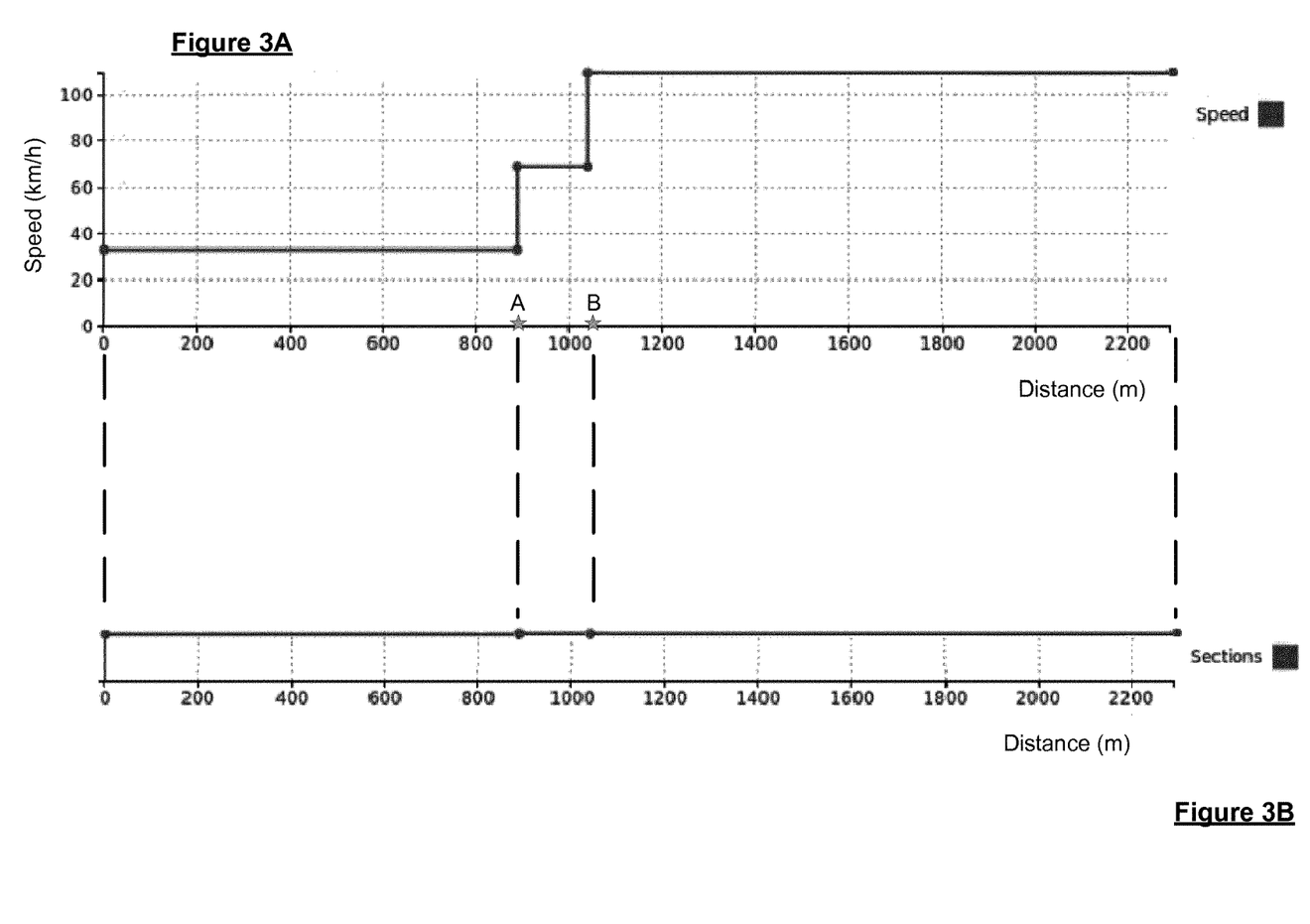
FIG. 3A illustrates variation in current average speed with respect to distance along a link.
FIG. 3B illustrates the link sections generated due to the speed variations shown in FIG. 2A.

In step 1, a server determines a current average speed of travel of vehicles along the link with respect to distance along the link. FIG. 3A illustrates one example of the variation in current average speed with respect to distance which might be obtained for a 2300 m long link. The average speed of travel is determined using live vehicle probe data for a given time period which result in the data being considered to be "live" for the purposes of the invention. The speed that is obtained is an absolute average speed.

In step 2, the server divides the link into sections which can each be associated with an applicable current average speed to enable the current flow data to be transmitted. The server creates a new section of the link whenever a change in the current average speed along the link is detected that exceeds a predetermined threshold. For the purposes of this example, a threshold of 20 km/h (kilometers per hour) is used. Referring now to FIG. 3A, it may be seen that there are two locations along the link at which a speed differential greater than 20 km/h occurs, which are labelled A and B. At point A, around 840 m along the segment, the average speed increases from around 35 km/h to around 70 km/h. At location B, around 1050 m along the link, the speed increases again from 70 km/h to around 110 km/h (the free flow speed for the link). Each of these increases in speed is of sufficient magnitude to trigger the sectioning of the link. The result is that the link will be divided into three sections, from 0 to about 840 m (corresponding to a congested portion with an average speed of travel of around 70 km/h), from about 840 m to about 1050 m (corresponding to a congested portion with an average speed of travel of around 110 km/h), and from about 1050 m to 2300 m (corresponding to a portion along which vehicles are moving at the free flow speed for the link)—see FIG. 3B.

Additional parameters may be taken into account when sectioning the link. In some embodiments the current free flow speed for the link with respect to distance along the link may be considered. The free flow speed is indicative of the speed that vehicles are expected to travel along the element with when there is no or substantially little traffic. The free flow speed typically correlates to the legal speed limit where applicable. Where the free flow speed exhibits a change that exceeds a predetermined threshold, a new section may be created. This process will proceed in the same manner as sectioning by reference to current average speed data as illustrated in FIG. 3A, but instead considering the free flow speed along the link that is applicable at the current time. Variation in free flow speed is typically indicative of changes to the underlying infrastructure of the link, rather than more transient factors affecting flow, such as traffic jams. This may identify additional sections to those identified by reference to the current average speed data for the link where a free flow speed change exceeding the relevant threshold occurs at a different point to the change in current average speed. A predetermined threshold based on a differential in free flow speed used in sectioning the link might be 20 km/h as with the current average speed. Thus, a new section will be created if a differential in free flow speed exceeds 20 km/h.

The sectioning may also take into account traffic event data. Traffic event data may be obtained identifying links, or portions thereof, that are affected by traffic jams. The traffic data will typically identify at least a start point and length of an affected portion, and usually a speed associated therewith. A new section may be created where there is a change in traffic condition along the link, e.g. where traffic event data indicates that a traffic jam starts, or where there is a closure on the link.

Finally, there may be a constraint placed as to the minimum length of a section created. In one example, the minimum length may be 100 m. Thus, if the conditions are met to create a new section based on current speed, or, where applicable, free flow speed or traffic condition, the section will only be created if this does not result in any section being less than 100 m long. The minimum length is a predetermined threshold that may be set as desired, e.g. depending upon the number of sections the system may potentially be able to handle, etc.

In step 3, data indicative of each determined section of the link is generated, and stored in association with data indicative of the location of the link. The data indicative of each section of the link is associated with data indicative of the applicable current average speed of travel for that section of the link. Thus, in the example of FIGS. 3A and 3B, data indicative of the three sections identified will be generated and stored, each being associated with its applicable current average speed, i.e. 35, 70 or 110 km/h.

The data indicative of the location of the link may be in terms of the relevant location reference for the link, i.e. a TMC code, or OpenLR™ location reference, etc. The data indicative of each section will indicate the location of the section along the link in terms of an offset (i.e. a distance from one end of the link) specified with respect to the location reference for the link. The data may be stored by the server ready for transmission to a device or devices requiring flow data for the link.

It will be seen that the sectioning of the link for use with current flow data therefore occurs dynamically, such that the link is sectioned into sections of variable length. The sections are generated as required. A new section is only created where the variation in the speed data justifies this i.e. to maintain an appropriate granularity of the data to reflect variation in speed along the length of the link. Furthermore, as the sections are created by sectioning a link, it is possible to describe the locations of the sections in a simple manner, in terms of an offset from a location reference for the link. The present invention thus provides a balance between avoiding generating excessive quantities of data, that would require large amounts of bandwidth to transmit, and place demands upon data processing and storage capabilities of transmitting and receiving devices, and providing a good level of resolution of the data. This is in contrast to prior art techniques using a fixed section length.

In addition to the current average speed data, i.e. current flow data for a link, it is often desirable to determine predicted flow data along the link in respect of one or more future time, e.g. 15, 30 and 45 minutes from the current time. This method is described by reference to FIG. 2.

Figure 2:
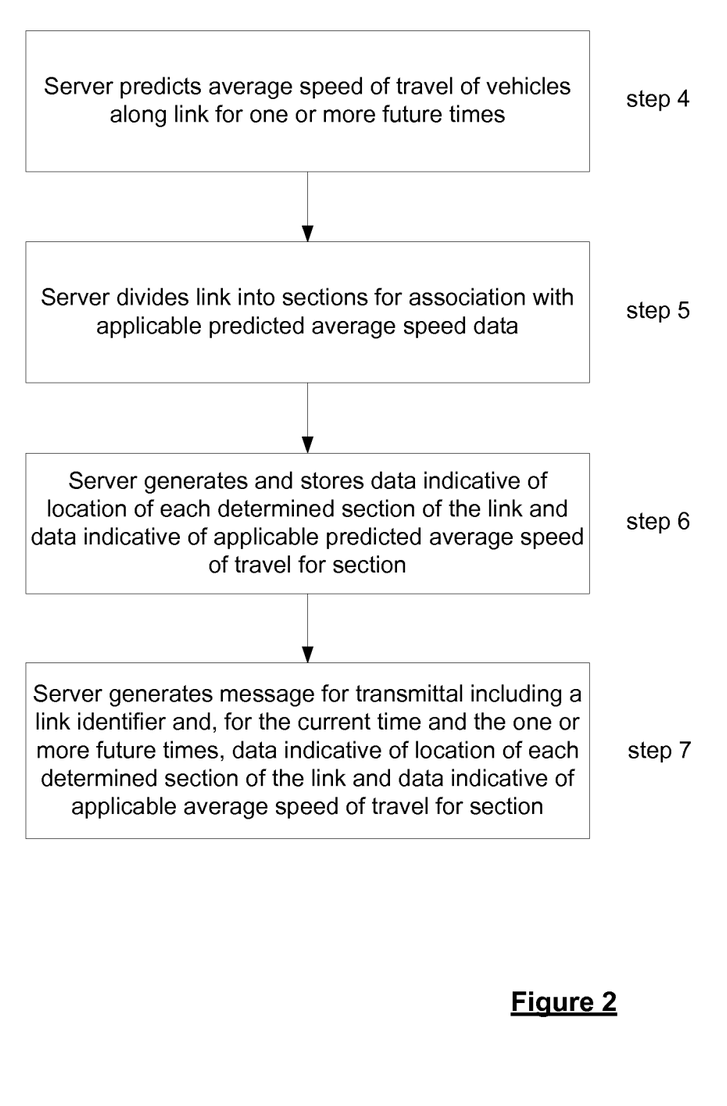
FIG. 2 is a flow chart illustrating the additional steps of a method for generating flow speed data in accordance with an embodiment of the invention.

Flow data for the link, i.e. average speed of travel of vehicles along the link, is firstly predicted for one or more future times—step 4. Predicted flow data for a future time of interest may be obtained using any technique known in the art. For example, the flow data for a future time may be obtained using the current average speed data for the link and expected speed data applicable for the future time. The expected flow data may be based on historical vehicle probe data for a time period including the time of interest. For example, expected speed data is often available for predetermined timeslots through the day, on each day of the week, e.g. 10 minute timeslots. The predicted flow speed for a future time may be taken to correspond to the expected speed for that time unless the current flow speed differs significantly from the flow speed that would be expected for the current time. If the link, or a portion thereof is affected by a traffic event, applicable to the future time in question, then the flow speed associated with the traffic event may be used for that portion of the link. Where a traffic event has expired, or is close to expiring, the reduction in the flow speed associated with the traffic event may be gradually reduced to the expected flow speed for the current time.

The link is sectioned for the purposes of generating predicted flow speed data for a future time or times in a similar manner to that described by reference to the current flow data, but with at least a threshold based on the predicted flow speed for the relevant future time differing from that used for the current flow rate data—step 5. This will typically result in the link being divided into different sections to those obtained for the current time data, and, where predicted data for multiple future times is obtained, into different sections for each future time.

The following description is by reference to the predicted flow rate data for one particular future time. It will be appreciated that the same steps may be carried out to section the link in respect of predicted flow rate data for each other future time considered.

The server creates a new section of the link whenever a change in the predicted average speed along the link for the future time is detected that exceeds a predetermined threshold. For the purposes of this example, a threshold of 40 km/h is used. Thus, a more stringent threshold is used than the 20 km/h threshold used for sectioning the link for the current average speed data. This means that there will typically be fewer sections generated for the future time data, as there will be fewer points along the link at which a difference in speed of the required magnitude to trigger creation of a new section occurs. Referring now to FIG. 3A, assuming that this plot represented future time data rather than current time data, it may be seen that the change in speed at point A would not be of sufficient magnitude to trigger creation of a new section, being around 35 km/h. However, the increase in speed from around 70 km/h to 110 km/h would just be sufficient to trigger creation of a new section. Thus, the link would be divided into only two sections, from 0 to about 1050 m, and from about 1050 m to 2300 m.

Additional parameters may be taken into account when sectioning the link by reference to predicted flow data for a future time. In some embodiments the free flow speed for the link (applicable to the future time) with respect to distance along the link may be considered. The free flow speed for the future time may differ from that for a current time, e.g. due to planned changes in infrastructure, long term roadworks affecting a speed limit, etc. In contrast to the threshold used for assessing the predicted speed data for the future time, the threshold used in assessing changes in free flow speed may be the same as that used when assessing free flow speed when sectioning the link in respect of current flow data, i.e. 20 km/h in this example. Although, in other embodiments, a more stringent threshold may again be used when assessing variations in free flow speed, e.g. sectioning the link when the free flow speed varies by more than 40 km/h. The sectioning may also take into account future traffic event data. A new section may be created where there is expected to be a change in traffic condition along the link, e.g. where traffic event data indicates that a traffic jam applicable to the future time starts, or where there is expected to be a closure on the link.

Finally, as with sectioning for current flow data, there may be a constraint placed as to the minimum length of a section created. However, for sectioning by reference to the predicted flow data, the minimum length is increased relative to that used for the current flow data, i.e. to 200 m.

It is envisaged that the threshold regarding difference in flow speed used in sectioning predicted flow data may be different for each future time. In particular, a more stringent, i.e. higher, threshold may be used for each successively future time. For example, thresholds in respect of speed differential for use with data in respect of 15, 30 and 45 minutes ahead of a current time respectively might be 40 km/h, 45 km/h and 50 km/h. If free flow speed is taken into account for sectioning a link in respect of any additional future times, it is envisaged that the same threshold may be used as when sectioning the link in respect of flow data for a first future time or the current time. A minimum section length might be set at progressively longer lengths for each successive future time.

It will be appreciated that by adjusting the thresholds used for sectioning the predicted flow data for a future time in comparison to that for the current time (and optionally for each successive future time), so as to reduce the likelihood of a new section being created, i.e. by making the requirement for new section creation more stringent, the link will be divided into fewer sections, which will typically be longer, than would have been the case for corresponding current time data. This means that the data resolution will be lower than for the current time data. However, the Applicant has realised that as predicted flow data is inherently less reliable than current time data, being based on predictions rather than actual measured data, there is no point in providing the data to such a high level of resolution as current time data. In this way, by reducing the number of sections likely to be created, the amount of bandwidth needed to transmit the resulting data may be reduced, but in a manner that has little impact in practice.

Once the data has been generated for a given future time, data indicative of each section of the link is associated with data indicative of the link, as described for the current time data—step 6. The data is also associated with data indicative of the future time to which it relates. The data for each section is associated with data indicative of the average speed of travel for the future time for the section.

Figure 5:
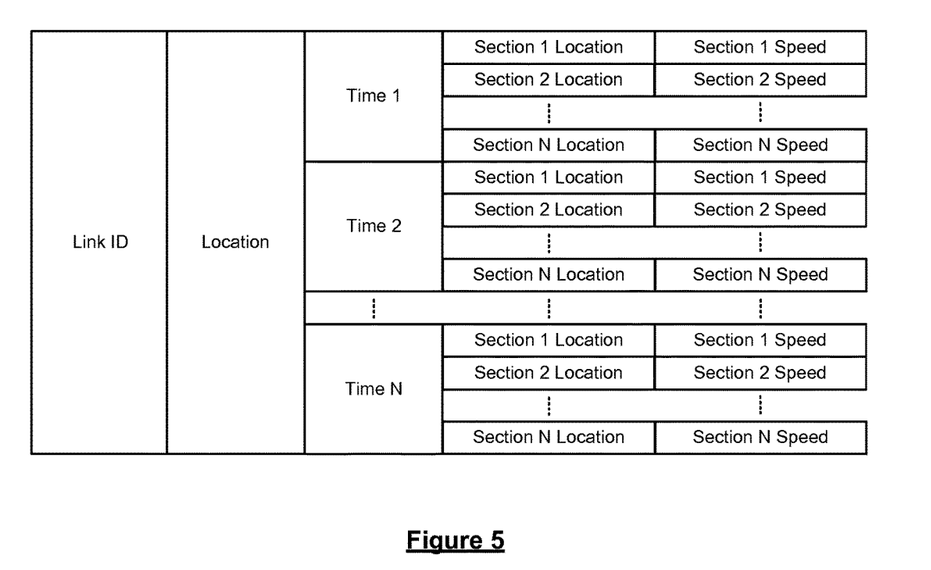
FIG. 5 shows an example of a message generated for a link in accordance with an embodiment of the invention.

The data stored in accordance with the invention in any of its embodiments, whether for current time or future time flow data, may be transmitted—step 7. The data may be transmitted to a server, or a remote device, e.g. a navigation device that requires flow data. An example message that is generated in respect of a link is illustrated in FIG. 5. The message includes a 'link ID' and 'link location'. The message also includes 'section location' and 'section speed' information, typically multiple instances of such information, for each of one or more times (e.g. 'Time 1' can be a current time, 'Time 2' can be 15 minutes in the future, etc).

The generated data (for transmittal) may be used in routing applications, or may be used together with expected flow data to determine traffic events affecting the network, or for any other desired purpose. The data may provide a flow speed feed, whether live or predicted, for any suitable application. The data may be associated with an indication as to the reliability of the data. This may be based upon the quality, amount and age of live data upon which it is based, an expected variance of speeds on the road based on the average speed data, a spatial coverage of the live data, and an amount, if any, of historic data used to fill any gaps in the live data to provide the average speed data.

Figure 4:
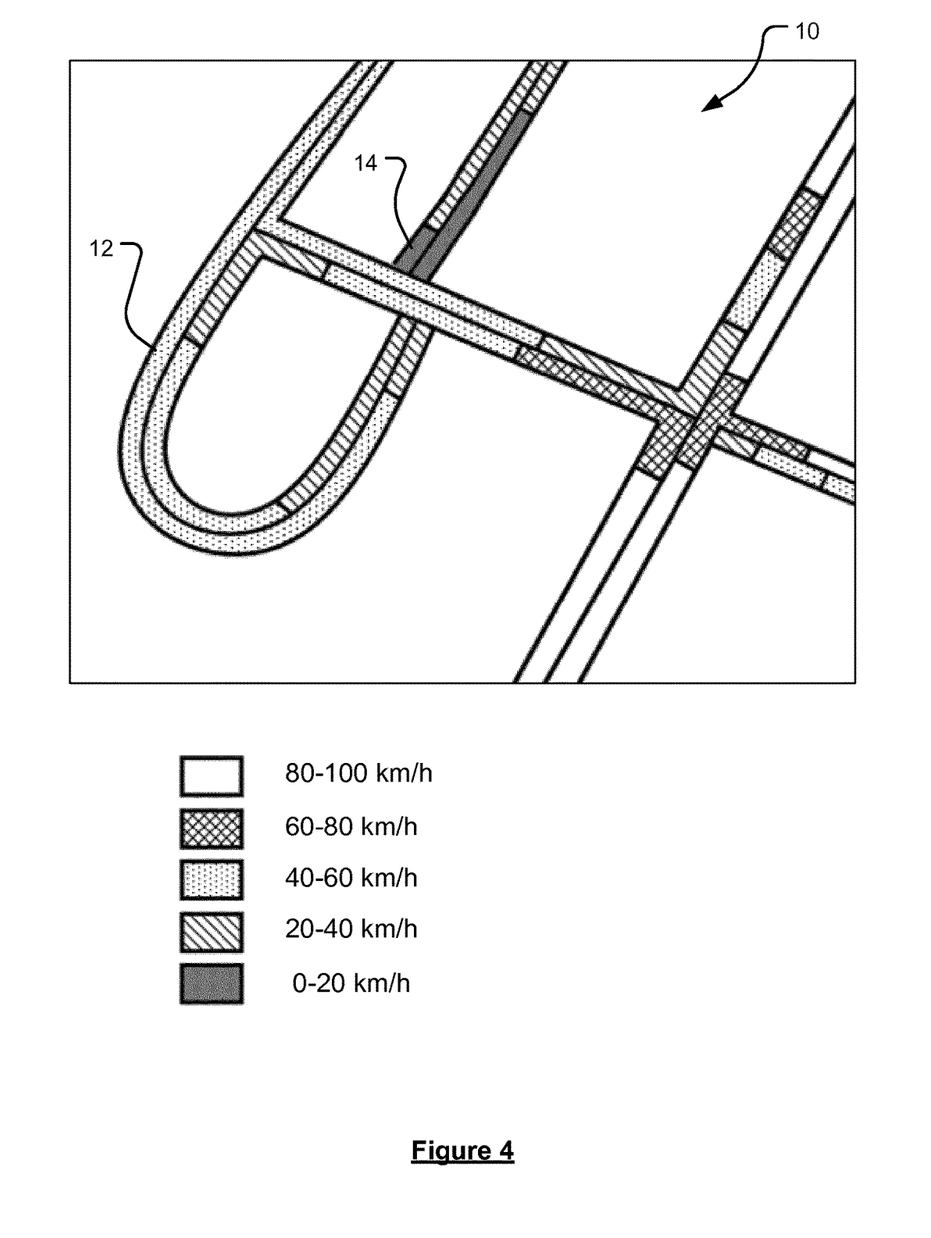
FIG. 4 shows a visual representation of an electronic map with an indication of flow speeds associated with segments.

FIG. 4 shows a visualisation 10 of the road network in a geographic area, as represented by electronic map data for the region. The road network includes a number of road segments. The road segments have been shaded to indicate the different sections which may be defined along links including the segment, in the manner of the present invention. The current average speed associated with each section is indicated by the shading as being in one of 5 ranges, from 0-20 km/h up to 80-100 km/h. Between each section, there will be a difference in associated average speed according to the threshold that was used in section creation, e.g. 20 km/h. It will be seen that this results in there being sections of variable length. Where there is no significant change in current flow speed, a new section will not be created, resulting in some relatively long sections, e.g. section 12. However, where there are significant changes in current speed over a smaller distance, new sections will have been triggered, resulting in some short sections such as section 14. This illustrates the way in which new sections will be created where they are needed to be able to transmit average speed data at an appropriate resolution. However, where detail is not required, i.e. where average speeds are more uniform over longer distances, rather than arbitrarily dividing such segments up into smaller sections, longer sections may be used. In this way the data is generated in a form which does not use excessive amounts of bandwidth, but which does capture the variation in average speed occurring along length of segments, and hence links including the segments.

While the above examples are by reference to the use of current or predicted average speed data for the link that is absolute speed data, the invention may alternatively or additionally equally be applied using relative speed data e.g. relative to a free flow speed for the link, or portion thereof. A threshold used in sectioning would then be in relation to a differential in relative speed.

Finally, it should be noted that whilst the accompanying claims set out particular combinations of features described herein, the scope of the present invention is not limited to the particular combinations of hereafter claims, but instead extends to encompass any combination of features or embodiments herein disclosed irrespective of whether or not that particular combination has been specifically enumerated in the accompanying claims at this time.

The invention claimed is:

1. A method of generating flow data indicative of speeds of travel within a navigable network in an area covered by an electronic map, the electronic map comprising a plurality of segments representing navigable elements of the navigable network, the method comprising:

obtaining data indicative of the average speed of travel for the current time with respect to distance along a link of the navigable network, wherein the link is predefined by reference to the electronic map and comprises at least a portion of one or more segments of the electronic map, the obtaining comprising receiving positional data acquired from a mobile device, the positional data having been generated by the mobile device using one or more position-determining systems of the mobile device;

sectioning the link to provide a plurality of sections along the length thereof, and generating data indicative of the average speed of travel for the current time in respect of each one of the plurality of sections of the link, wherein the link is sectioned based on the data indicative of an average speed of travel for the current time along the link and is sectioned only when the sectioning would result in sections having lengths exceeding a predetermined minimum length; and storing data indicative of the location of the link for transmittal together with data indicative of each determined section of the link, the data indicative of each determined section of the link being associated with data indicative of the average speed of travel for the current time for the section.

2. The method of claim 1, wherein the link is sectioned based on the data indicative of an average speed of travel for the current time along the link and one or more of: a free flow speed for the link; the existence of a traffic event affecting the link; and a requirement in relation to a minimum length of each section.

3. The method of claim 1, comprising analysing data indicative of a free flow speed of travel with respect to distance along the link, and sectioning the link when a free flow speed differential along the length of the link exceeds a threshold.

4. The method of claim 1, comprising analysing data indicative of traffic events affecting links of the network, and sectioning the link when a traffic event associated with the link is detected.

5. The method of claim 1, comprising sectioning the link using at least one first threshold based on the current average speed of travel along the link.

6. The method of claim 5, wherein the at least one first threshold is a threshold in respect of an average speed of travel differential along the length of the link for the current time, the method comprising sectioning the link when it is determined that a differential in the current average speed of travel between adjacent portions of the link exceeds the threshold.

7. The method of claim 1, further comprising:

obtaining data indicative of a predicted average speed of travel with respect to distance along the link for at least one future time;

sectioning the link to provide a plurality of sections along the length thereof, and generating data indicative of the average speed of travel for the at least one future time in respect of each one of the plurality of sections of the link, wherein the link is sectioned based on the data indicative of a predicted average speed of travel for the at least one future time along the link; and storing data indicative of the location of the link for transmittal together with data indicative of each determined section of the link, the data indicative of each determined section of the link being associated with data indicative of the predicted average speed of travel for the at least one future time for the section.

8. The method of claim 7, wherein the link is sectioned in relation to the current average speed data when a first set of one or more criteria relating to at least the current average speed of travel along the link is fulfilled, and the link is sectioned in respect of the predicted average speed of travel data for a future time when a second set of one or more criteria relating to at least the predicted average speed of travel along the link for the future time is fulfilled, wherein at least some of the second set of criteria are more stringent than the corresponding ones of at least some of the first set of criteria.

9. The method of claim 7, wherein sectioning the link based on data indicative of an average speed of travel along the link for a current time comprises using a first threshold based on the current average speed of travel along the link, and wherein sectioning the link based on data indicative of an average speed of travel along the link for a future time comprises using a second threshold based on the predicted average speed of travel along the link for the future time, wherein the second threshold is a more stringent threshold than the first threshold used in sectioning a link based on current average speed of travel along the link.

10. The method of claim 7, wherein sectioning the link based on data indicative of an average speed of travel along the link for a current time comprises using a first threshold in respect of an average speed of travel differential along the length of the link for the current time, and sectioning the link when it is determined that a differential in the current average speed of travel between adjacent portions of the link exceeds the first threshold, and wherein sectioning the link based on data indicative of a predicted average speed of travel along the link for a future time comprises using a second threshold in respect of a predicted average speed of travel differential along the length of the link for the future time, and sectioning the link when it is determined that a differential in the predicted average speed of travel for the future time between adjacent portions of the link exceeds the second threshold, wherein the second threshold is a higher threshold than the first threshold used in sectioning a link based on a differential in current average speed of travel along the link.

11. The method of claim 7, comprising sectioning the link in respect of the predicted average speed data for a future time only when the sectioning would result in a section having a length exceeding a predetermined minimum length, wherein the minimum length is greater than a predetermined minimum length required when sectioning the link in respect of current average speed data.

12. The method of claim 7, further comprising sectioning the link in respect of the predicted average speed data for a plurality of successive future times, wherein progressively more stringent criteria are used in the sectioning in respect of successive future times.

13. The method of claim 1, wherein the data indicative of the average speed of travel for at least one of a current and at least one future time is indicative of an absolute average speed of travel.

14. The method of claim 1, further comprising using the stored data to determine a route in the electronic map from an origin to a destination, and to at least one of: (i) provide navigation instructions using an output device to guide a user along the determined route; and (ii) display the determined route on a display device.

15. The method of claim 1, further comprising using the stored data to determine traffic events, and to display the traffic events on a display device.

16. The method of claim 1, further comprising transmitting at least some of the stored data to a device.

17. A system, comprising one or more processors and a data storage device, for generating flow data indicative of speeds of travel within a navigable network in an area covered by an electronic map, the electronic map comprising a plurality of segments representing navigable elements of the navigable network, the one or more processors being arranged to:
    obtain data indicative of the average speed of travel for the current time with respect to distance along a link of the navigable network, wherein the link is predefined by reference to the electronic map and comprises at least a portion of one or more segments of the electronic map, the obtaining comprising receiving positional data acquired from a mobile device, the positional data having been generated by the mobile device using one or more position-determining systems of the mobile device;
    section the link to provide a plurality of sections along the length thereof, and generating data indicative of the average speed of travel for the current time in respect of each one of the plurality of sections of the link, wherein the link is sectioned based on the data indicative of an average speed of travel for the current time along the link and is sectioned only when the sectioning would result in sections having lengths exceeding a predetermined minimum length; and
    store, in the data storage device, data indicative of the location of the link for transmittal together with data indicative of each determined section of the link, the data indicative of each determined section of the link being associated with data indicative of the average speed of travel for the current time for the section.

18. A non-transitory computer readable medium comprising instructions which, when executed by one or more processors of a system, cause the system to perform a method for generating flow data indicative of speeds of travel within a navigable network in an area covered by an electronic map, the electronic map comprising a plurality of segments representing navigable elements of the navigable network, the method comprising:
    obtaining data indicative of the average speed of travel for the current time with respect to distance along a link of the navigable network, wherein the link is predefined by reference to the electronic map and comprises at least a portion of one or more segments of the electronic map, the obtaining comprising receiving positional data acquired from a mobile device, the positional data having been generated by the mobile device using one or more position-determining systems of the mobile device;
    sectioning the link to provide a plurality of sections along the length thereof, and generating data indicative of the average speed of travel for the current time in respect of each one of the plurality of sections of the link, wherein the link is sectioned based on the data indicative of an average speed of travel for the current time along the link and is sectioned only when the sectioning would result in sections having lengths exceeding a predetermined minimum length; and
    storing data indicative of the location of the link for transmittal together with data indicative of each determined section of the link, the data indicative of each determined section of the link being associated with data indicative of the average speed of travel for the current time for the section.

* * * * *